United States Patent [19]

Muhich et al.

[11] Patent Number: 4,706,074

[45] Date of Patent: Nov. 10, 1987

[54] CURSOR CIRCUIT FOR A DUAL PORT MEMORY

[75] Inventors: John S. Muhich, Austin; Joseph S. Thornley, Round Rock, both of Tex.

[73] Assignee: International Business Machines Corporation, Armonk, N.Y.

[21] Appl. No.: 820,467

[22] Filed: Jan. 17, 1986

[51] Int. Cl.[4] .............................................. G06F 3/153

[52] U.S. Cl. .................................... 340/709; 340/799; 364/900

[58] Field of Search ................................ 340/709, 799

[56] References Cited

U.S. PATENT DOCUMENTS

| | | | |
|---|---|---|---|
| Re. 31,200 | 4/1983 | Sukonick et al. | 340/709 |
| 3,903,510 | 9/1975 | Zobel | 340/172.5 |
| 4,093,996 | 6/1978 | Hogan et al. | 364/900 |
| 4,434,475 | 2/1984 | McCaskill et al. | 340/709 |
| 4,445,194 | 4/1984 | Cason et al. | 364/900 |
| 4,454,507 | 6/1984 | Srinivasan et al. | 340/709 |
| 4,503,427 | 3/1985 | Iida | 340/709 |
| 4,555,772 | 11/1985 | Stephens | 364/900 |
| 4,625,202 | 11/1986 | Richmond et al. | 340/709 |
| 4,635,185 | 1/1987 | Kishi et al. | 340/709 |
| 4,651,299 | 3/1987 | Miyazaki et al. | 340/709 |
| 4,663,619 | 5/1987 | Staggs et al. | 340/799 |

*Primary Examiner*—Howard A. Birmiel
*Attorney, Agent, or Firm*—Thomas E. Tyson

[57] ABSTRACT

A cursor generation circuit for an image display system that includes a storing circuit for storing image data. The storing circuit includes a first port to provide access to the image data to the display system and a second port to provide access to the image data to a display device for displaying the image data. A combining circuit is further provided to combine the image data with cursor data in the storing circuit when the storing circuit is being accessed by the display device. However, the combining circuit removes the cursor data from the image data when the image data is being accessed by the display system through the first port.

10 Claims, 5 Drawing Figures

CURSOR CIRCUIT FOR A DUAL PORT MEMORY

TECHNICAL FIELD

This invention relates to video display systems and more specifically to a video display system providing all-points-addressable functions implemented using dual ported memory.

BACKGROUND ART

Video display screens typically provide a movable marker, referred to as a cursor, to provide a visible indication as to the current position of interest on the display screen. Traditionally, this function has been implemented by either the host system or the display logic circuitry. Lower cost, lower performance systems have used software to create and manage the cursor while more performance oriented systems have used more expensive logic circuits with the intention of minimizing system software overhead.

One example of a cursor circuit is disclosed in U.S. Pat. No. 4,555,772 entitled "Current Cursor Symbol Demarcation" assigned to the present assignee. This patent discloses a circuit for exclusively ORing selected cursor character data with corresponding image data in an image memory at the selected cursor position in the image.

U.S. Pat. No. 4,445,194 entitled "Multi-Directional Cursor Motion" assigned to the present assignee discloses a text processor that has a text storage buffer and a display control block both interconnected to an applications program and a display access method program wherein the processor and programs equate a contextual cursor address with a spatial cursor position to provide data to a refresh buffer which in turn provides display signals to visually present by means of the display screen a cursor at the identified position in text.

U.S. Pat. No. 4,093,996 entitled "Cursor for an On-The-Fly Digital Television Display Having an Intermediate Buffer and a Refresh Buffer" assigned to the present assignee discloses a cursor circuit that stores a coded representation of a cursor symbol in an intermediate buffer during a period of display where accessed by a conventional light pen.

U.S. Pat. No. 3,903,510 entitled "Scrolling Circuit for a Visual Display Apparatus" to Teletype Corporation discloses a circuit for addressing a storage memory to display data in a manner to combine a cursor row address counter with the memory address counter.

DISCLOSURE OF THE INVENTION

In accordance with the present invention, a cursor generation circuit for an image display system is provided that includes a circuit for storing image data. This circuit includes a first input/output port to provide access to the image data to the display system. The storing circuit also includes a second input/output port to provide access to the image data to a display device for the purpose of outputting the display data to be displayed on the display device. A combining circuit is provided to combine the image data and the storing circuit with cursor data for the display device when the display device is accessing the storing circuit through the second input/output port. The combining circuit further removes the cursor data from the image data when the storing device is being accessed through the first port.

In the preferred embodiment, the invention includes a dual port random access memory that provides a display system with read/write access to the memory through a first port. The second port is a serial in, serial out port to provide an image data serial bit stream to a display device. A processor is connected to the memory to provide cursor data in the image data storage of memory during access by the display device through this second port. This cursor data is removed from the image data when the memory is being accessed through the first port. The cursor data is, therefore, transparent to the display system accessing the image memory.

BRIEF DESCRIPTION OF THE DRAWING

Still further objects and advantages of the invention will become apparent from the detailed description in the claims when read in conjunction with the accompanying drawings wherein:

BEST MODE FOR CARRYING OUT THE INVENTION

A cursor function implemented in logic circuits is highly desirable in high performance video display systems to minimize system software overhead. Typical implementations of this function, however, are relatively expensive. This invention provides the desired cursor function, in a unique way and with very low circuitry cost.

Basic video formatting in a raster based video display system consists of reading each scan line of the bit map, a memory which contains the display image, serializing the bit map in synchronization with the electron beam scanning of the display screen, and outputting the resultant serial data stream to control the beam intensity. Each bit of the bit map is called a pixel and is the smallest addressable display element on the screen or in bit map.

Video formatting in this display is controlled by the scan line counter. The counter is incremented after the writing of each scan line to the screen and is reset at the end of every frame. The counter thus describes the current Y position that is being written on the screen at any instant in time.

Figure 1:
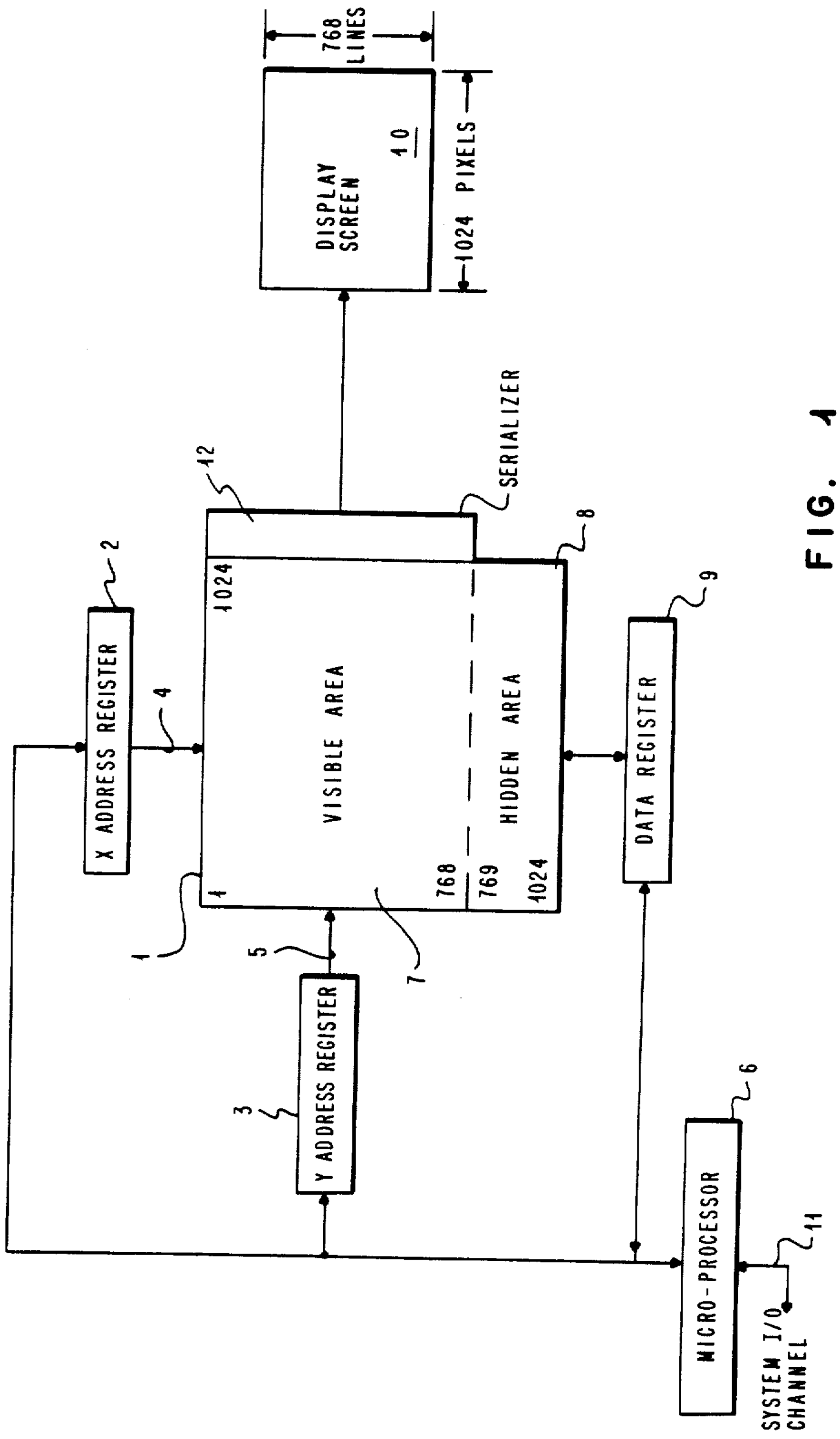
FIG. 1 is a block diagram of the display system.

The cursor is generated during the video formatting operation. In FIG. 1, this is accomplished by a microprocessor 6 executing microcode.

Figure 3:
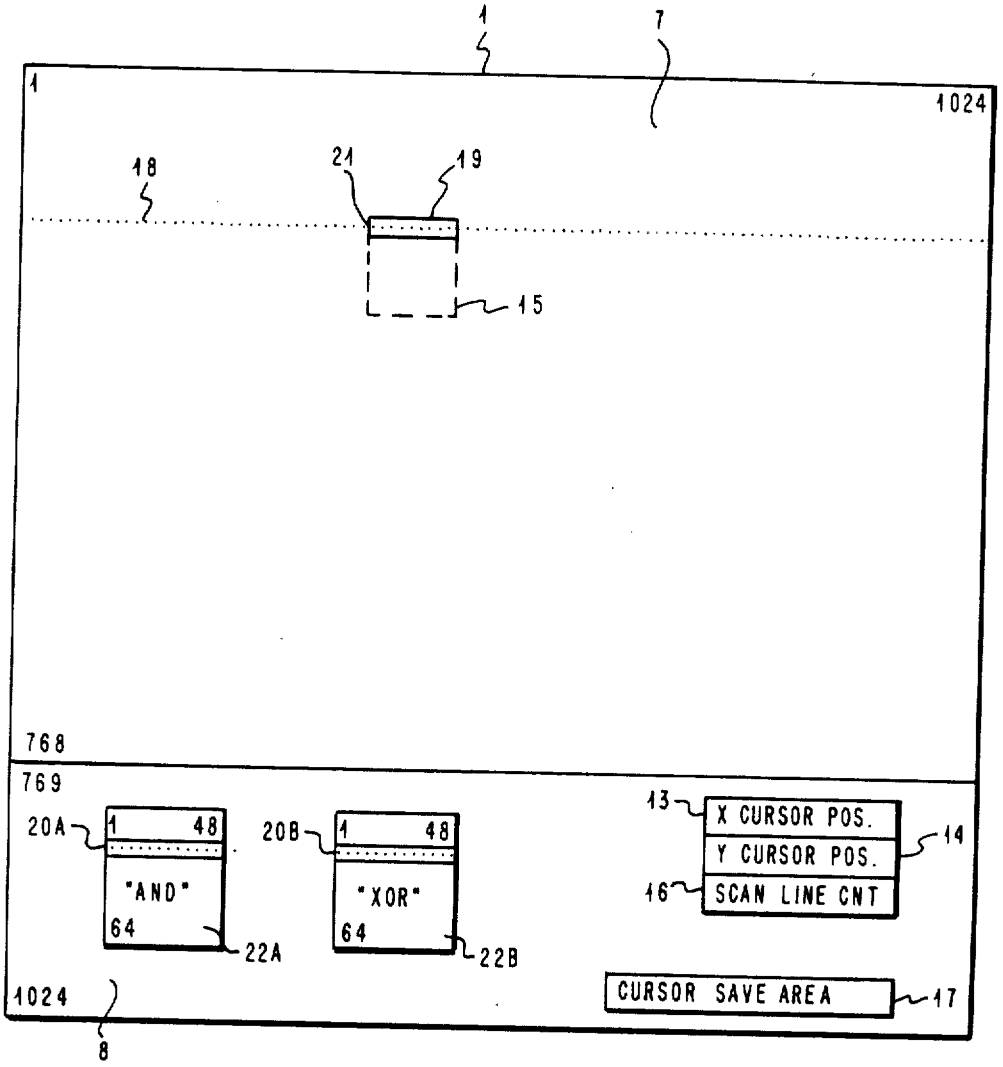
FIG. 3 is an illustration of the cursor technique according to the present invention.

In FIG. 3, the cursor position on the screen is defined by two registers, the X cursor position register 13 and the Y cursor position register 14. These registers 13 and 14 are loaded and maintained by the host system in accordance with the desired screen position of the cursor, representing X and Y screen coordinates respectively.

During video formatting, a comparison of the Y cursor position register 14 with the scan line counter 16 determines whether video formatting is within the range of the cursor 15.

The actual size and shape of the cursor image is defined by the host system and is programmable within certain limitations. The host system establishes the pattern of pixels to be used as the cursor, and stores that pattern within a specific rectangular block of bits in a portion of the bit map 8 that is not visible on screen (the hidden area). The size and shape of the stored pattern is limited only in that it must lie within the specified rectangle. This invention manipulates the entire rectangle as though it were the cursor. This entire area of the cursor pattern is logically combined with the corresponding displayable area of the bit map 7 to produce the desired cursor on the screen.

The technique for displaying the cursor, defined by the host system, requires that this invention efficiently change the source of the serialized bit stream from one area of the bit map to another at the exact instant the beam reaches the desired cursor position and to logically combine two or more areas of the bit map and save the results for latter use. These two capabilities are provided by the use of VIDEO RAM configured in a manner disclosed in U.S. patent application Ser. No. 701,328 filed Feb. 13, 1985 and herein incorporated by reference, and micro-processor. In one embodiment, the video RAM would be a Texas Instrument TMS 4161. Hereinafter, the VIDEO RAM as configured will be referred to as a bit addressable multi-dimensional array memory or BAMDA.

Figure 4:
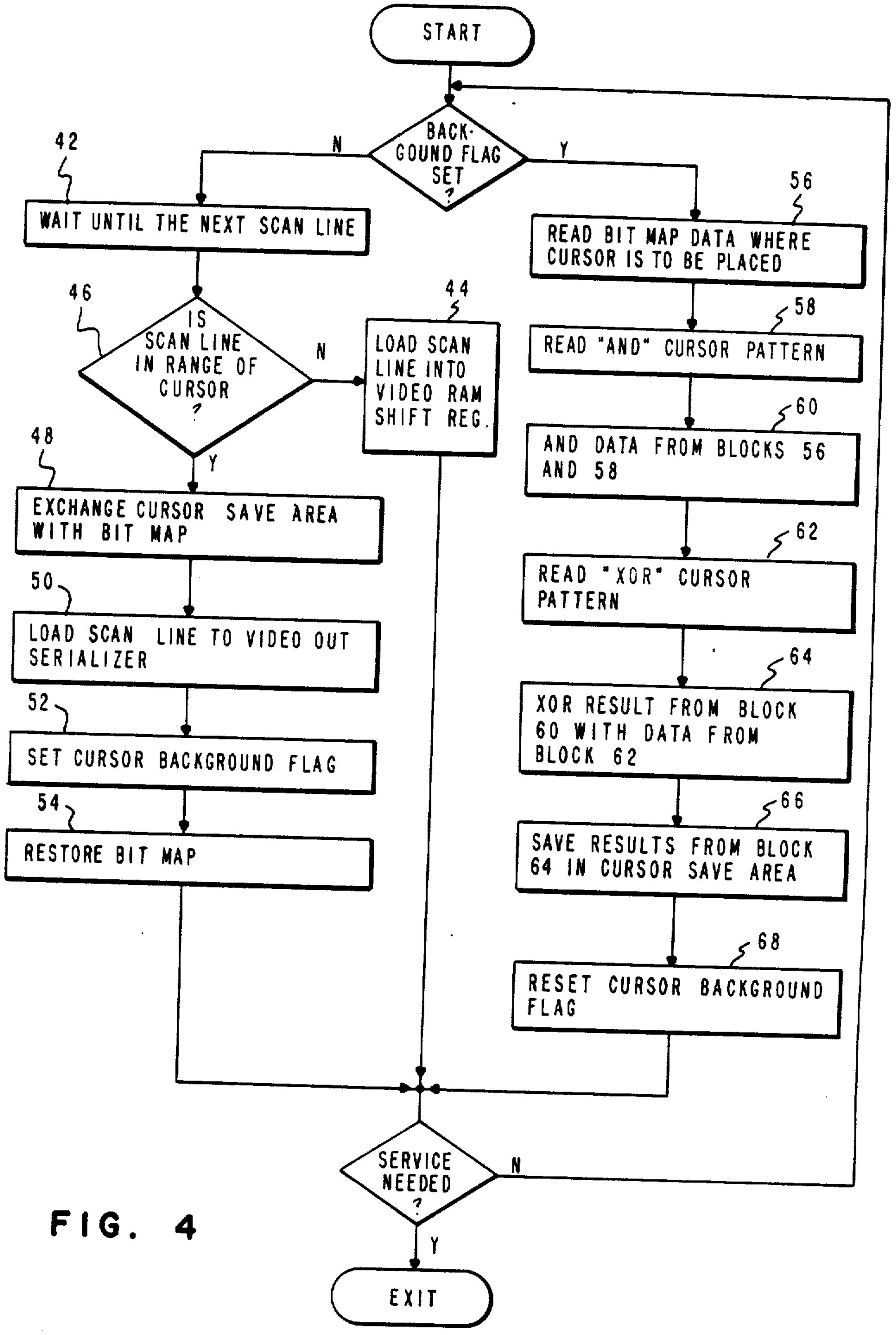
FIG. 4 is a flow chart depicting the sequence of operations to generate a cursor image and video formatting.

Refer to FIGS. 3 and 4 for the discussion of cursor image generation. Cursor processing begins one scan line before the line in which the cursor is to be displayed. This step in cursor processing is termed "preconstruction of the cursor". In FIG. 4, a cursor image is created by steps 56–68, by logically combining the cursor pattern(s) (FIG. 3) 22*a* and 22*b* with the bit map data at the location 21 in which the cursor is to be displayed. This process is done one line at a time for each scan line 18 and the respective cursor pattern line 20*a* and 20*b* as the video formatting proceeds from scan line to scan line down the bit map. The resultant pattern is stored in an assigned cursor save area 17 in the hidden bit map 8. This process does not preconstruct more than one line of cursor image at a time. However, one skilled in the art could preconstruct the entire cursor image before it is needed by the video formatter.

During the horizontal blanking time, the period just before the scan line for which the cursor save image 17 was created, the cursor save image 17 is exchanged with the bit map data 19 of the scan line 18 at the horizontal position 21 in which the cursor pattern is to appear. With the cursor save image 17 now inserted into the scan line 18, the entire scan line 18 is loaded into the Video RAM serial output port (FIG. 1) 12. It is important to note that this load operation takes only one memory cycle to load the entire scan line 18 of the 1024 pixels. This is accomplished very rapidly by virtue of the video ram serial output port 12. The serial video output data stream contains a cursor image, combined with the bit map data, and thus appears on the display screen as if the cursor pattern were actually merged into the display bit map.

As seen in steps 48–54 of FIG. 4, immediately after loading the video RAM serial output port, the original scan line is restored to its original state using the memory data bits which the exchange operation saved, thus preserving the bit map data.

In FIG. 1, all system I/O data 11 must pass through the micro-processor 6, and therefore, the bit map update from the system I/O channel 11 is prevented by the micro-processor 6 during the exchange and resort process. This ensures that no update is erroneously performed on cursor data instead of bit map data.

The operations described above (FIG. 4) are repeated for each scan line until the scan line counter indicates that maximum depth of the cursor has been reached, at which time normal video formatting 42, 46 and 44 resumes.

The above invention provides the following functions with minimal circuitry cost and system overhead:

1. Logical merging of a cursor pattern(s) with the serialized video data stream. This preserves bit map data integrity at all times and thus reduces the system software overhead usually associated with temporarily removing the cursor pattern from the bit map before each update procedure.

2. The cursor position is controlled simply by changing the content in the X and/or Y cursor position registers, which contain the actual X and Y screen coordinates for the cursor. This is as opposed to requiring host system to access the bit map itself and perform the necessary translation and memory masking operations involving arbitrary bit alignments.

3. The micro-code overhead to preform the cursor preconstruction is processed in the background by virtue of the video ram architecture.

4. The cursor is in the bit map 7, one line at a time, for a very short period of time. Because of this, the bit map 1 is available for system update most of the time giving the impression that the cursor is generated external to the bit map.

The following is a more detailed description of the invention.

FIG. 1 is a block diagram of the display system containing the present invention.

Communication between the host system and the display circuitry is via the system I/O channel 11.

In the preferred embodiment, the bit map 1 is a special BAMDA memory array organized as 1024 lines of 1024 bits each. The bit map 1 possesses the following special property: it is accessible from one to sixteen bits at a time, with the resultant access beginning on any arbitrary bit boundary and extending for one to sixteen bits in either the vertical (down) or horizontal (right) direction. The starting point for BAMDA access is specified by an X register 2 and a Y register 3, providing a ten bit X and Y rectilinear coordinate respectively on address lines 4 and 5.

Micro-processor 6 is a microprogrammed logic sequencer such as an Advanced Micro Devices part No. 29226. This micro-processor 6 includes a set of general purpose registers, an arithmetic/logic unit and a control unit. The micro-processor 6 is controlled in accordance with micro-instructions stored in high speed Read-Only-Memory (see FIG. 4). The micro-processor 6 controls all display system operations including the reading and writing of data to and from the bit map 1. The micro-processor 6, through its registers and logic unit, also provides the ability to logically modify the contents of bit map 1 or the data being written or read by the system software.

The bit map 1 is divided into two logical areas, the visible display memory 7 and the hidden display memory 8. In the preferred embodiment, visible bit map 7 is 768 lines of 1024 bits each and represents all of the bits that are directly mapped to the display screen 10 as pixels, i.e. it is the visible bit map 7 with each bit corresponding to a specific pixel location of the display screen 10. The hidden area 8 is the remaining 256 lines of 1024 bits each and is physically identical, and contiguous to the visible area 7 and also represents a bit map of pixels. The hidden area, however, is not scanned and mapped directly to the display.

System may read or modify the bit map 1 either by reading or writing the data register 9 directly, under control of the micro-processor 6, or by requesting the micro-processor 6 to perform a micro-coded sequence of operations in accordance with its pre-programmed micro instructions.

The following will describe the unique circuit features and micro-coded operations that have been implemented to allow the system to control and display a sophisticated cursor image with a minimum of system software processing overhead.

Figure 2:
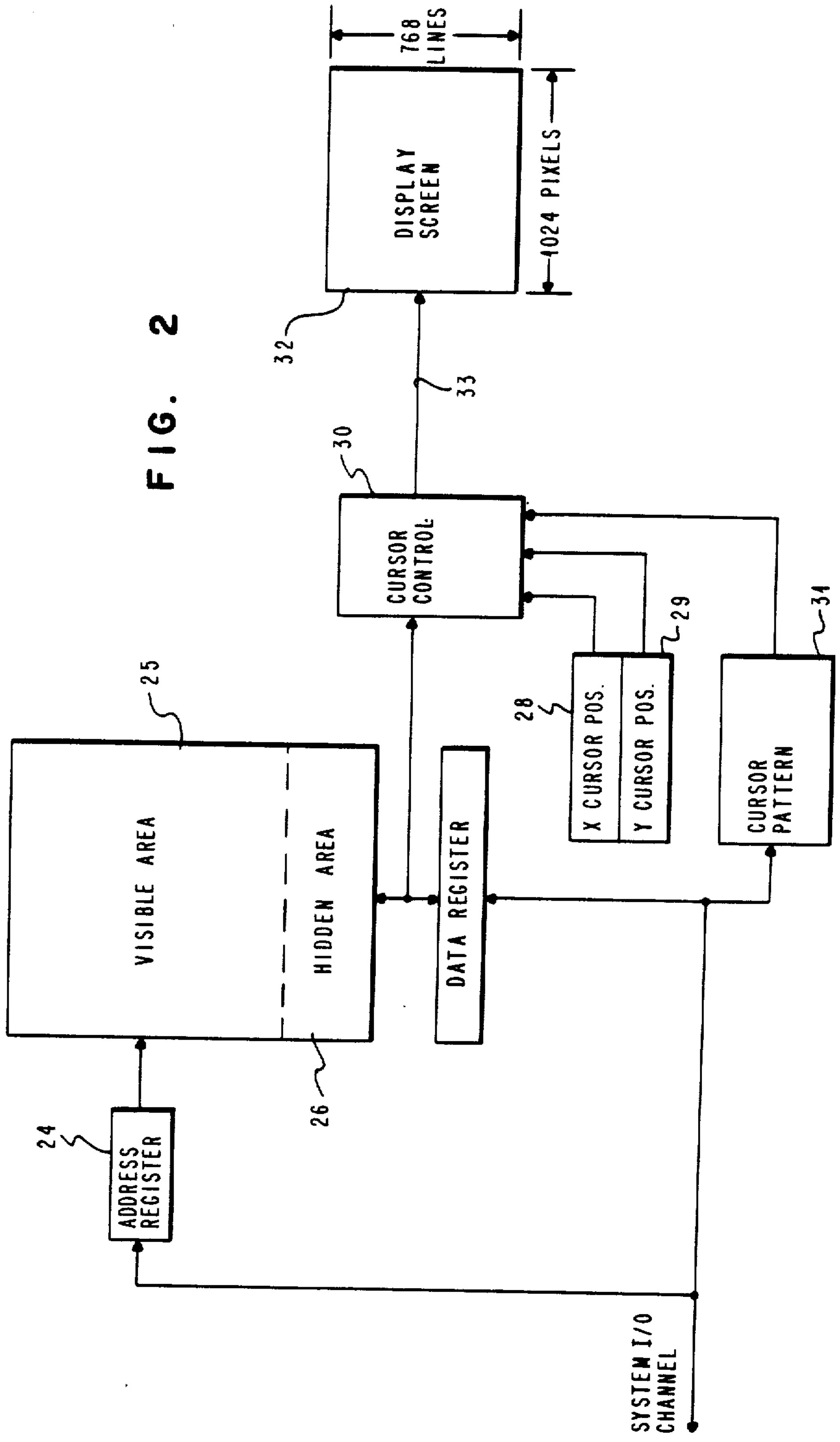
FIG. 2 is an illustration of a prior Art.

To fully explain the novelty of the present invention, the prior art will be discussed. FIG. 2 illustrates a classical prior art logic circuit approach to providing cursor control.

The cursor, requires four components 28, 29, 30, and 31 that are not needed when the cursor is implemented as described in this invention.

Cursor control logic 30 uses the outputs of X and Y cursor position registers 28 and 29 to determine the precise time in which to merge the cursor pattern 31 into the serial video data 33. This merge process must be done with care to avoid skewing of the serial data.

Block 31 is a memory/register large enough to contain the cursor pattern. The point being, that there must be data available for insertion at all times without any latency.

Blocks 28 and 29 are registers loaded by system software. The contents of the two registers are used to position the cursor on the screen 32. These registers, like block 31, must have their outputs available to block 30 at all times. For this reason, registers 28 and 29 cannot reside in the hidden area 26 of the bit map.

FIG. 3 provides the additional details of the present invention.

The present invention provides complete cursor functioning with a minimum of circuitry.

The system must specify three pieces of information to enable the cursor to be displayed: 1. The exact nature of the cursor (size and shape). 2. The desired position of the cursor on the display screen. 3. The type of logical merge of the cursor pattern with the bit map pixels.

Specification of the size and shape is accomplished by writing a bit pattern in a specified, unused, area of the hidden bit map 8, called the cursor pattern area 22a and 22b. This operation need only be performed once unless the cursor pattern is to be changed or power removed from the bit map. Loading of the cursor pattern area can be accomplished via a write operation from the system I/O channel 11 or a copy from any other area of the bit map 1. The maximum size of the cursor is limited by the size of the rectangular block of bits assigned to this function by the micro-processor 6 microcode. The maximum horizontal assignable size is limited by the display circuit speed. The width of the cursor dictates the number of bit map 1 memory cycles required to complete cursor processing. If the width of the cursor is excessive, severe timing problem occur. The technique implemented is assumed to have a cursor pattern area 22a and 22b of sixty four lines of forty eight bits each. This allows a maximum cursor image on the display screen 10 of forty eight pixels wide by sixty four pixels high.

Figure 5:
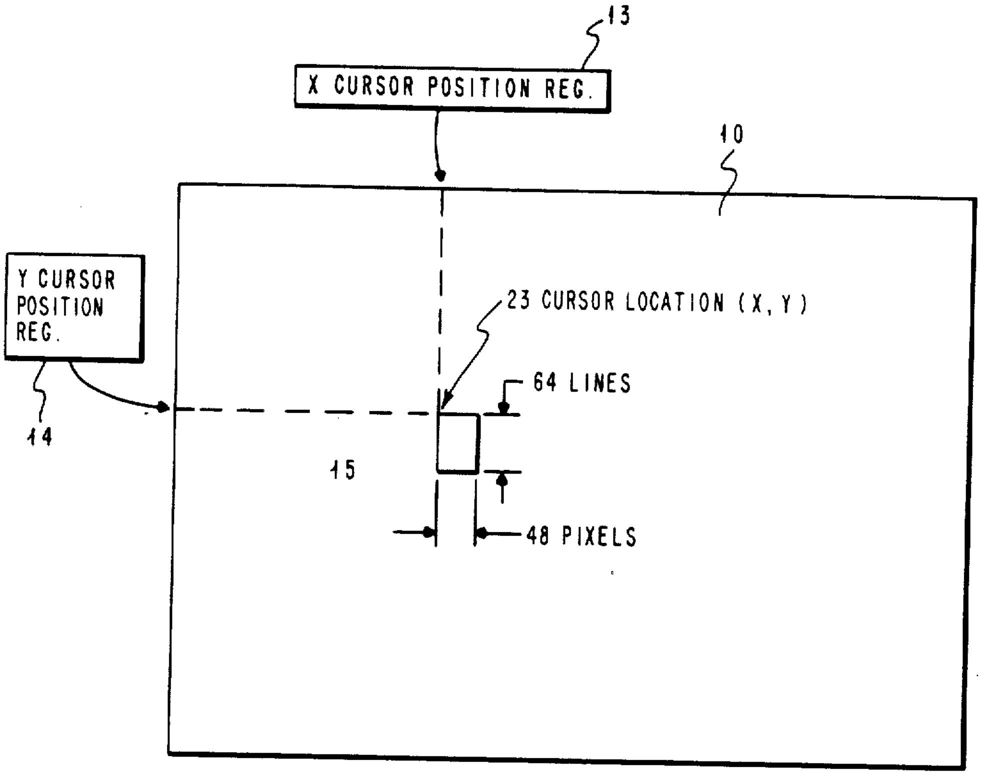
FIG. 5 is an illustration of a display screen and a cursor rectangle positioned on the screen.

The precise location of the cursor is specified by the value contained in the two cursor position registers 13 and 14, which are two unused 16 bit words in the hidden bit map 8. To establish the position 23 (FIG. 5) of the cursor rectangle 15, in screen coordinates, system software simply writes the required value to each of these fixed locations 13 and 14 in the hidden portion 8 of the bit map 1. The micro-processor 6 treats these two locations as dedicated registers, the X cursor position register 13 and the Y cursor position register 14.

At this point, no further system involvement is required to display the cursor. Movement of the cursor requires only that the system update either or both the X cursor position register 13 or the Y cursor position register 14.

To complete the requirements for maintenance and control of the cursor, two additional elements which reside in the hidden bit map are needed.

A 16 bit word location is assigned to hold the current scan line position pointer. This word is referred to as the "scan line counter" 16. This register 16, which is used for cursor control and video processing, is cleared during vertical blanking period of the CRT, and incremented by 1 during each horizontal blanking period.

Finally, a cursor save area 17 must be dedicated in the hidden bit map to hold an preconstructed cursor scan line image. This, in the preferred embodiment, is a 48 bit wide by one bit high rectangular block and is used to store one line at a time of a cursor image. The micro-processor 6 uses this area during cursor processing (FIG. 4).

Video formatting is controlled by the micro-processor 6 and consists primarily of managing the conversion of scan lines to serial video output data, timing and control of CRT synchronization signals.

FIG. 4 illustrates the microcode executed by the micro-processor 6 during video formatting, the value of the scan line counter and the Y cursor position register are compared to detect cursor range 46. If the comparison shows that the cursor should start on the next scan line 18, then the bit map data 19 is logically combined with the cursor pattern 20a and 20b and stored in the cursor save area 7 of hidden memory 8. To accomplish this, the 48 bits 19 of the scan line that will be affected by the cursor are read from the visible bit map 7 and saved. That same data is then logically ANDed with cursor pattern 20a and then XORed with cursor pattern 20b and then the result is placed in the cursor save area 17. The starting bit 21 of the affected scan line area 19 is provided by the X cursor position register 13. Other ways and sequences of doing the logical function(s) should be apparent to those skilled in the art.

Now the bit map data 19 has been fully merged with the cursor pattern 20a and 20b and is stored in the cursor save area 17.

When it is time to load the next scan line into the video RAM serial output port 12, the cursor image in the temporary save area 17 is exchanged with the bit map data 19. After the exchange, the merged bit map data and cursor image data reside in the scan line 18 that is to be displayed next. The scan line 18 is now ready to be displayed on the screen and the entire scan line is loaded into the video RAM serial output port 12 during horizontal blanking. It is then serialized and sent to the display 10.

Once the scan line 18 is loaded into the video RAM serial output port 12, the original bit map data is restored.

Between the time that the merged cursor data in the cursor save area 17 is exchanged with the bit map data 19, and the bit map data is restored to the scan line 18, the bit map cannot be accessed by the host system. Because of this, the cursor does not appear, to the host system, to be in the bit map at all and gives the impression that the cursor is completely controlled by logic circuits.

The logical function of ANDing and XORing of the bit map data is illustrated in FIG. 4. This microcode steps 56-68 are executed one scan line before it is to be serialized and displayed, i.e., when the previous scan line is being serialized and sent to the Display 10. It is approximately 90% of the total time required for a complete horizontal period. Because of this long period of time, 90%, computation of the cursor pattern can be done in background mode. This is done ahead of time so it can be exchanged quickly during the Video Formatting period (horizontal blanking) which is approximately 10% of total time required to complete a horizontal period.

While this invention has been particularly shown and described with reference to a preferred embodiment thereof, it will be understood by those skilled in the art that the foregoing and other changes in form and detail may be made therein without departing from the spirit and scope of the invention.

We claim:

1. A cursor generation circuit for an image display system, said circuit comprising:

means for storing image data representing a visual image and including a first port to provide read/write access to said image data to a means for generating said image data and a second port to provide read/write access to said image data to a means for providing a display of said visual image; and means for combining said image data with cursor data in said storing means during access through said second port.

2. A cursor generation circuit according to claim 1 wherein said storing means includes means to temporarily store said cursor data apart from said image data.

3. A cursor generation circuit according to claim 2 wherein said combining means includes means for logically combining said cursor data with said image data to form combined data representative of the visual image including a cursor marker.

4. A cursor generation circuit for an image display system, said comprising:

means for storing image data arranged as data lines representing display lines of picture elements of a visual image, said storing means including a first port to provide read/write access to said image data to a means for generating said image data and a second port to provide read/write access to said image data to a means for providing said visual image, wherein access through one of said ports excludes access through the other port;

means for providing cursor data to said storing means; and means for combining said image data with said cursor data in said storing means during access through said second port.

5. A cursor generation circuit according to claim 4 wherein said storing means includes means for storing said cursor definition data.

6. A cursor generation circuit according to claim 6 wherein said combining means performs logical operations on the cursor definition data and the image data in said storing means to form combined data representative of the visual image including a cursor marker.

7. A cursor generation circuit according to claim 7 wherein said combining means includes means for swapping a display line portion containing the image data with the image data logically combined with said cursor data before the display line is accessed through said second port and restoring the image data when the display line is being accessed through said first port.

8. An image display circuit for displaying both image and cursor information comprising:

means for generating image data of a visual image;

a memory connected to store said image data including a first port to provide access to said image data to said means for generating said image data and a second port to provide data to a means for providing a presentation of said visual image;

means for providing cursor data to said memory; and means for combining said image data with cursor data in said memory during access through said second port.

9. An image display circuit according to claim 8 wherein said combining means performs logical operations on the cursor data and the image data in said memory to form an image including a cursor marker.

10. An image display circuit according to claim 9 wherein said combining means includes means for swapping a display line portion containing image data with the image data logically combined with said cursor data before the display line is accessed through said second port and restoring the image data when the display line is being accessed through said first port.

* * * * *